United States Patent [19]

Ohmori et al.

[11] Patent Number: 5,072,431
[45] Date of Patent: Dec. 10, 1991

[54] MAGNETO-OPTICAL DISK RECORDING APPARATUS

[75] Inventors: Takashi Ohmori; Hirotoshi Fujisawa, both of Tokyo, Japan

[73] Assignee: Sony Corporation, Tokyo, Japan

[21] Appl. No.: 507,036

[22] Filed: Apr. 10, 1990

[30] Foreign Application Priority Data

May 23, 1989 [JP] Japan .................................. 1-130679

[51] Int. Cl.$^5$ ...................... G11B 13/04; G11B 11/12
[52] U.S. Cl. ..................................... 369/13; 360/114; 360/59; 360/66
[58] Field of Search ...................... 369/13; 360/59, 66, 360/114, 125

[56] References Cited

U.S. PATENT DOCUMENTS

| 4,740,937 | 4/1988 | Watanabe | 369/13 |
| 4,803,674 | 2/1989 | Nakao et al. | 369/13 |
| 4,984,225 | 1/1991 | Ando | 369/13 |
| 4,993,009 | 2/1991 | Shiho | 369/13 |

FOREIGN PATENT DOCUMENTS

| 61-284801 | 12/1986 | Japan | 369/13 |
| 62-185269 | 8/1987 | Japan | 360/114 |
| 62-248152 | 10/1987 | Japan . | |
| 63-46644 | 2/1988 | Japan . | |
| 63-55704 | 3/1988 | Japan | 360/114 |
| 2181879 | 4/1987 | United Kingdom . | |

Primary Examiner—Stuart S. Levy
Assistant Examiner—Hoa Nguyen
Attorney, Agent, or Firm—Lewis H. Eslinger

[57] ABSTRACT

A magneto-optical recording apparatus comprising an optical head shiftable in the diametrical direction of a magneto-optical disk and capable of irradiating a light beam onto the magneto-optical disk, and a magnetic head disposed to be mutually opposite to the optical head with the magneto-optical disk interposed therebetween and capable of applying a magnetic field to the magneto-optical disk while being shifted in the diametrical direction of the magneto-optical disk, wherein the magnetic head is shiftable in the diametrical direction of the magneto-optical disk together with the optical head. The magnetic head consists of an E-shaped core and a coil wound around a center core element thereof, and the E-shaped core is so formed that the sectional length of the center core element in one direction extending toward two side core elements becomes equal to or shorter than the sectional length in another direction orthogonal thereto. The magnetic head is so disposed that the orthogonal direction of its core becomes coincident with the diametrical direction of the magneto-optical disk.

8 Claims, 5 Drawing Sheets

# MAGNETO-OPTICAL DISK RECORDING APPARATUS

BACKGROUND OF THE INVENTION

1. Field of the Invention

The present invention relates to a magneto-optical disk recording apparatus and, more particularly, to an apparatus for recording desired information on a magneto-optical disk by the use of a modulated magnetic field whose polarity is changed in accordance with the information to be recorded.

2. Description of the Prior Art

In the conventional magneto-optical disk recording apparatus known heretofore, it is customary that a light beam emitted from a laser light source is irradiated intermittently on a recording film of a magneto-optical disk and a magnetic head is driven while being supplied with a modulated signal based on the information to be recorded. The temperature of the recording film on the magneto-optical disk is locally raised by the application of a modulated magnetic field, whose polarity is inverted in conformity with the information, sent from the magnetic head to the recording film on the magneto-optical disk, so that the perpendicular magnetized film is oriented by the polarity of the modulated magnetic field of the magnetic head and the information is recorded on the magneto-optical disk.

In a magneto-optical disk recording apparatus 1, a magneto-optical disk 2 is placed on a tray 3 as shown in FIG. 1. The tray 3 is movable between one position outside of an opening in an unshown apparatus case, i.e. a position where a magneto-optical disk is replaceable, and another position inside of the opening in the apparatus case 1, i.e. a position where a recording or reproducing operation is performed on the magneto-optical disk by an optical head and a magnetic head which will be described later. The tray 3 is moved as indicated by an arrow a so that the magneto-optical disk 2 can be loaded in or ejected from the apparatus body.

An optical head 4 and a magnetic head 5 are held by a holding member 6 in such a manner as to be retained opposite to each other with the magneto-optical disk 2 interposed therebetween.

The holding member 6 is movable in the radial direction of the magneto-optical disk 2 as indicated by an arrow b, and both the optical head 4 and the magnetic head 5 are shifted to a desired recording track on the magneto-optical disk when the holding member 6 is moved in the direction of the arrow b by unshown shifting means.

The magnetic head 5 used in such magneto-optical disk recording/reproducing apparatus comprises a sectionally E-shaped cylindrical core 8 and a coil 9 wound around a center core element 8A of the core 8 with a predetermined number of turns, as illustrated in FIG. 2.

Therefore, when a driving current is fed to the coil 9 in accordance with the information to be recorded, a modulated magnetic field symmetrical with respect to the central axis of the center core element 8A is generated between the center core element 8A and a side core element 8B. The desired information can be recorded on the magneto-optical disk 2, or more specifically in the recording film on the disk 2, with application of such modulated magnetic field thereto by the magnetic head 5 simultaneously with irradiation of the light beam produced by the optical head 4 from the reverse side with respect to the magnetic field.

If the magneto-optical disk recording apparatus of the type mentioned is dimensionally reduced to realize a compact structure adapted to be easily carried, great convenience will be attained by connecting such small-sized magneto-optical disk recording apparatus to any of various information processors in compliance with individual requirements.

For achieving such purpose, however, it is necessary to simplify the mechanism for moving the tray 3 and so forth to realize a more compact structure for the magneto-optical disk recording apparatus as a whole.

OBJECTS AND SUMMARY OF THE INVENTION

The present invention has been accomplished in view of the problems mentioned above. The object is to provide an improved magneto-optical disk recording apparatus having a small-sized and simplified structure.

According to one aspect of the present invention, there is provided a magneto-optical disk recording apparatus which includes an optical head movable in the diametrical direction of a magneto-optical disk and capable of irradiating a light beam onto the magneto-optical disk, and a magnetic head disposed to be mutually opposite to the optical head with the magneto-optical disk interposed therebetween and capable of applying a magnetic field to the disk while being shifted in the diametrical direction of the magneto-optical disk. The magnetic head comprises an E-shaped core and a coil wound around a center core element thereof, wherein the E-shaped core is so formed that the intensity of the magnetic field generated from the magnetic head is changed more gradually in the diametrical direction of the magneto-optical disk than in the direction orthogonal thereto.

According to another aspect of the present invention, there is provided a magneto-optical disk recording apparatus which comprises an apparatus body equipped with an optical head movable in the diametrical direction of a magneto-optical disk and capable of irradiating a light beam onto the disk, a cover attached to the apparatus body in a manner to be swingable thereto, a magnetic head disposed in the cover to be shiftable in the diametrical direction of the magneto-optical disk and serving to apply a magnetic field to the disk, and lock means for swinging the magnetic head relative to the disk in accordance with the swing of the cover.

In the E-shaped core, the sectional length of the center core element in one direction extending toward the side core elements is equal to or shorter than the sectional length in another direction orthogonal thereto. And the magnetic head is so disposed that the orthogonal direction mentioned becomes coincident with the direction of motion thereof.

Thus, it becomes possible to expand the applicable range of a modulated magnetic field with respect to the orthogonal direction. Therefore, if the core is so positioned that the orthogonal direction coincides with the diametrical direction of the magneto-optical disk, the mechanism for holding the magnetic head can be simplified.

Other aspects and features of the present invention will become apparent from the following description given with reference to the accompanying drawings.

DESCRIPTION OF THE PREFERRED EMBODIMENTS

Hereinafter an exemplary embodiment of the present invention will be described in detail with reference to the accompanying drawings.

Figure 1:
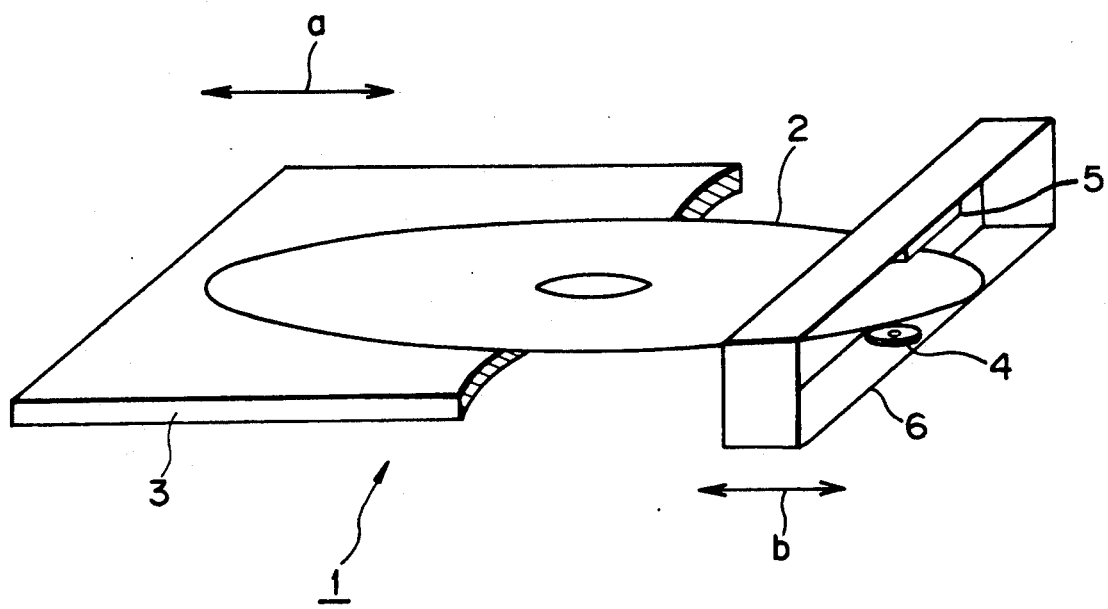
FIG. 1 is a perspective view of a conventional magneto-optical disk apparatus.
Figure 3:
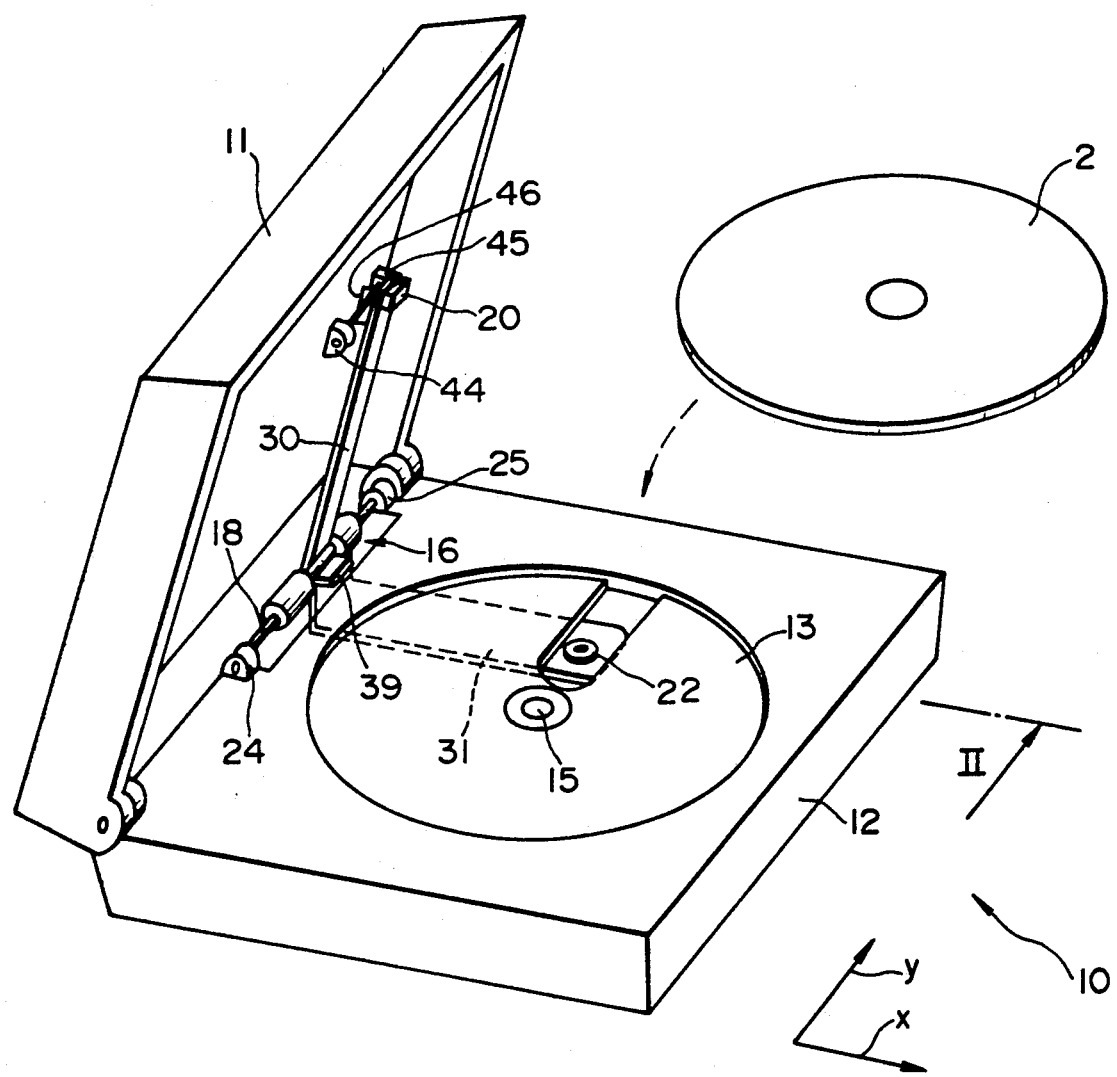
FIG. 3 is a perspective view of an exemplary magneto-optical disk recording apparatus embodying the present invention.

Denoted by 10 in FIG. 3 is a magneto-optical disk recording apparatus as a whole, wherein a cover 11 is manually opened or closed so as to load or remove a magneto-optical disk 2.

In the magneto-optical disk recording apparatus 10, a circular recess 13 for loading a magneto-optical disk is formed at the center of the upper surface of an apparatus body 12, and a rotary spindle 15 of a spindle motor projects from the central floor of the recess 13. As in any general optical disk recording and/or reproducing apparatus, the spindle 15 is furnished with a disk table for centering an optical disk or a magneto-optical disk. Typically, a magneto-optical disk is placed on the disk table. In this case, the disk table projects through the floor of the recess 13 so as to prevent contact of the magneto-optical disk with the floor of the recess 13.

Therefore, when the magneto-optical disk 2 loaded in the recess 13 is placed on an unshown disk table supported by the spindle 15, the disk 2 can be rotated together with rotation of the disk table driven by the spindle motor.

For the purpose of preventing the magneto-optical disk from slipping off the disk table during rotation, it is a matter of course that a holding mechanism may be disposed at the center of the disk table to hold the central portion of the magneto-optical disk, or a grip member may be disposed inside of the cover 11 to grip the magneto-optical disk in a manner to be rotatable together with the disk table.

Meanwhile, hinge means is provided in a rear portion on the upper surface of the apparatus body 12 so as to hold the cover 11 by two lateral edges swingably to the apparatus body 12, whereby the cover 11 can be swung to open or close the recess 13.

An opening 16 is formed in a rear portion on the upper surface of the apparatus body 12, and a magnetic head 20 and an optical head 22 are mutually interlocked via a shaft 18 positioned above the opening 16.

At the two lateral edges of the opening 16, there are formed bearings 24 and 25 which project from the upper surface of the apparatus body 12, and two ends of the shaft 18 are held by such bearings 24 and 25.

Figure 4:
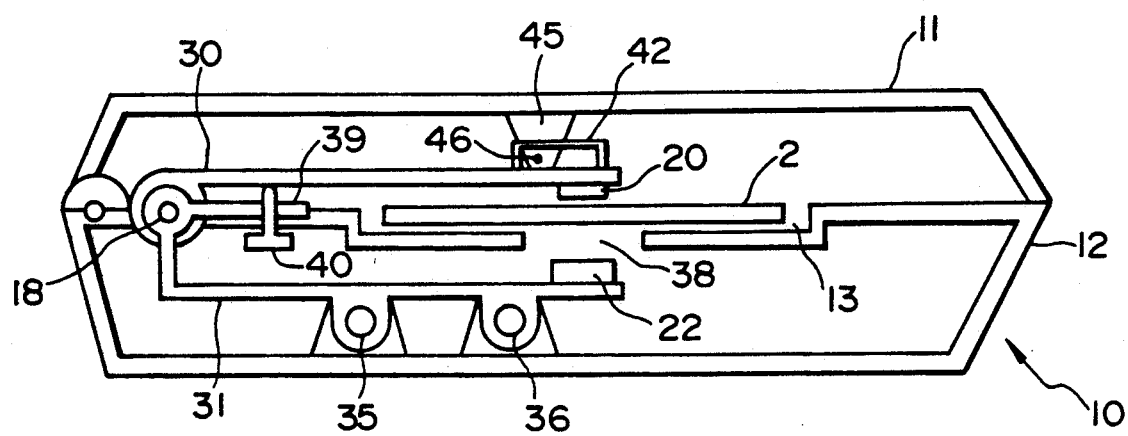
FIG. 4 is a sectional view showing the detailed structure of such apparatus.

As illustrated in FIG. 4, a magnetic head support member 30 is pivotally retained by the shaft 18 in a manner to be shiftable in the diametrical direction of the magneto-optical disk or the axial direction of the shaft 18. The magnetic head support member 30 is rendered swingable toward or away from one surface of the magneto-optical disk on the reverse side with respect to irradiation of the light beam from the optical head. That is, the shaft 18 functions as a hinge pin of a hinge mechanism for swinging the magnetic head support member 30 and also as a guide pin for the magnetic head support member 30.

Furthermore, an optical head support member 31 is attached to the shaft 18 in a manner to hold the magnetic head support member 30 in between the two ends of the shaft 18, so that the magnetic head support member 30 is actuated by the driving force of the optical head support member 31 and is thereby shifted along the shaft 18 in the diametrical direction of the magneto-optical disk by this connection to the optical head support member 31.

The optical head support member 31 thus retained by the shaft 18 is also retained pivotally to be shiftable in the diametrical direction of the magneto-optical disk by guide shafts 35 and 36 disposed in the apparatus body 12 in parallel with the shaft 18, and is driven by unshown feed means such as a linear actuator so as to be shifted along the guide shafts 35 and 36.

The magnetic head support member 30 and the optical head support member 31 are mutually connected via the shaft 18 as mentioned, so that when the optical head support member 31 is shifted along the shaft 18 and the guide shafts 35, 36 by the feed means, the magnetic head support member 30 can also be shifted in accordance therewith in the diametrical direction of the magneto-optical disk.

Meanwhile an optical head 22 is mounted on the fore end of the optical head support member 31 and is so set as to be capable of focusing, through an objective lens disposed in the optical head 22, a light beam emitted from a laser light source in the optical head 22. This light beam travels through a slit 38, which is formed in the recess 13 of the apparatus body 12, to the magneto-optical disk 2 loaded in the apparatus body 12.

Due to the shift of the optical head support member 31, the light beam from the optical head 22 shifted along the guide shafts 35, 36 by the feed means can be positionally displaced in the diametrical direction of the magneto-optical disk 2, so that the light beam can irradiate a desired recording track on the magneto-optical disk 2.

The optical head support member 31 has a plate-shaped projection 39 in the proximity of the bearing portion of the shaft 18, and a screw 40 is inserted into the projection 39. The amount of swing of the magnetic head support member 30 can be changed by adjusting the length of protrusion of such screw 40.

A magnetic head 20 is disposed at the fore end of the magnetic head support member 30 in a manner to be opposed to the optical head 22.

Thus, since the amount of swing of the magnetic head support member 30 is changeable by adjusting the length of protrusion of the screw 40, the distance between the magneto-optical disk 2 and the magnetic head can be adjusted by a simplified operation.

A U-shaped lock member 42 is attached to the fore end of the magnetic head support member 30 on the reverse side with respect to the magnetic head 20, whereby the magnetic head support member 30 can be swung in accordance with the action of opening or closing the cover 11.

In the cover 11, there are formed bearings 44 and 45 projecting inward, and a shaft 46 is disposed between the two bearings 44 and 45.

The shaft 46 is supported substantially in parallel with the aforementioned shaft 18 while extending through a rectangular space defined by the magnetic head support member 30 and the lock member 42.

Therefore, when the cover 11 is opened, the lock member 42 is lifted up by the shaft 46, so that the magnetic head 20 is moved away from the apparatus body 12 in accordance with the swing of the cover 11.

Thus, the magnetic head 20 can be shifted with facility by manually opening or closing the cover 11.

As a result, it becomes possible to easily load or eject the magneto-optical disk 2 without the necessity of a driving mechanism for a tray and so forth, thereby achieving a dimensional reduction and a simplified structure for the magneto-optical disk apparatus 10.

In case the magnetic head support member 30 and the optical head support member 31 are thus connected to each other through the shaft 18 so as to be held in an interlocking manner, it is unavoidable that a positional change of the magnetic head 20 relative to the optical head 22 is induced by each action of opening or closing the cover 11.

On the magneto-optical disk 2, therefore, a positional change occurs in the application of the modulated magnetic field as compared with the light beam irradiating position corresponding to the above-described positional change of the magnetic head 20, whereby the intensity of the modulated magnetic field is also varied.

Figure 2:
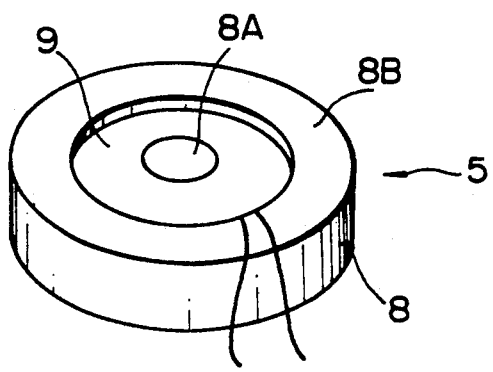
FIG. 2 is a perspective view of a magnetic head employed in the apparatus of FIG. 1.

Accordingly, if the conventional magnetic head 5 (shown in FIG. 2) is used in such a case, it may become difficult to attain a desired field intensity consequently bringing about a failure in the recording of information with certainty.

In an attempt to solve this problem, there may be contrived a means of dimensionally enlarging the magnetic head to expand the magnetic field's applicable range. However, since the inductance of the magnetic head increases substantially in proportion to the square of the cubic measure thereof, a required magnetic head driving circuit becomes more complex relative to the enlarged dimensions of the magnetic head. Such an increase in the power consumption eventually make practical employment of such magnetic head impossible in the small-sized magneto-optical disk recording apparatus 10.

Figure 5:
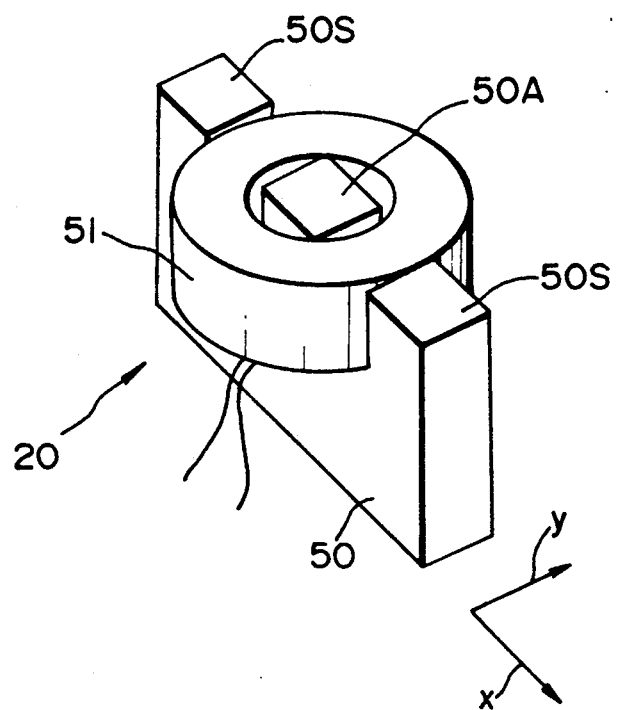
FIG. 5 is a perspective view of a magnetic head.

In view of such disadvantage, this embodiment is equipped with the magnetic head 20 of the structure illustrated in FIG. 5, so as to expand the magnetic field applicable range in comparison with the known structure.

In the magnetic head 20, a magnetic circuit is formed by a vertically sectionally E-shaped core 50 where its center core element 50A is square in horizontal section, and a cylindrical coil 51 is wound around the center core element 50A.

Figure 6:
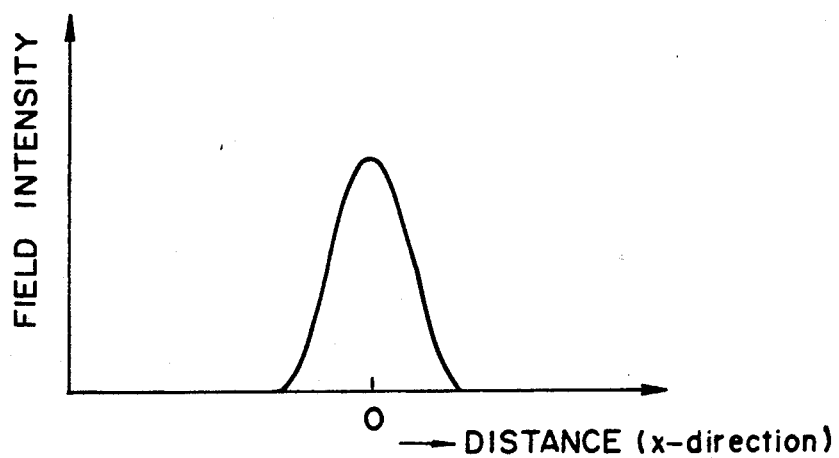
FIGS. 6 and 7 graphically show characteristic curves representing the operation of the magnetic head.

In this example where a magnetic circuit is formed by the vertically sectioned E-shaped core 50 including the horizontally sectional square core element 50A, the intensity of the modulated magnetic field is sharply decreased, as graphically shown in FIG. 6, in accordance with a recession from the center core element 50A (denoted by 0) toward the two side core elements 50S (i.e. in an x-direction).

Figure 7:
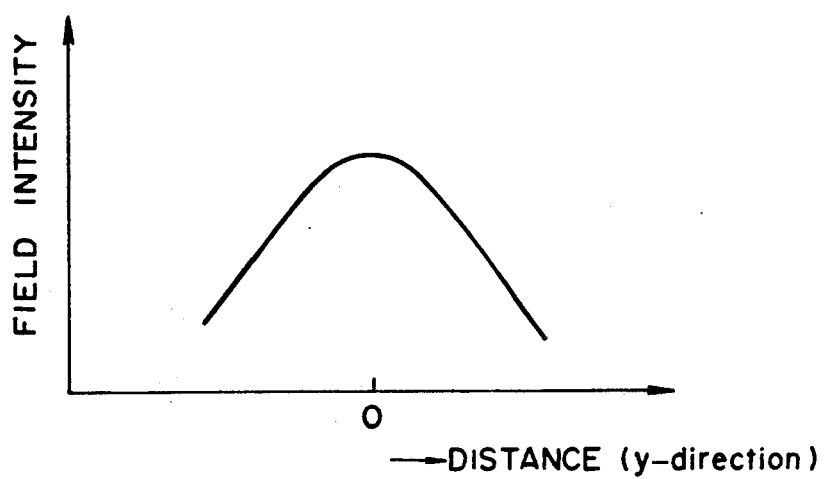

Meanwhile in a y-direction which is orthogonal to the x-direction, the intensity of the modulated magnetic field is gently decreased as graphically shown in FIG. 7, so that the magnetic field applicable range is expanded by 20 to 30 percent as compared with the conventional magnetic head (shown in FIG. 2) where a magnetic field is formed to be symmetrical with respect to the axis of the center core element 8A.

Thus, in this embodiment, the magnetic head 20 is so disposed that the y-direction becomes coincident with the radial direction of the magneto-optical disk 2 (i.e., the direction of shift of the magnetic head 20 and the optical head 22), whereby desired information can be recorded with certainty despite any positional change of the magnetic head 20 that may be induced by each action of opening or closing the cover 11.

Consequently an increase in the power consumption can be effectively averted to realize a compact magneto-optical disk recording apparatus 10.

Due to the above-described constitution where a magnetic circuit of the magnetic head 20 is formed by the vertically sectioned E-shaped core 50 including the horizontally sectioned square center core element 50A, the applicable range of the modulated magnetic field can be expanded as compared with the known example.

Therefore, desired information can be recorded with certainty even in a modified constitution where the magnetic head 20 is swingable in accordance with the action of opening or closing the cover 11 and where magnetic head 20 is shifted together with the optical head 22 through the shaft 18. Thus, a small-sized magneto-optical disk recording apparatus 10 can be realized in a simplified structure where the cover 11 is manually opened and closed.

Figure 8:
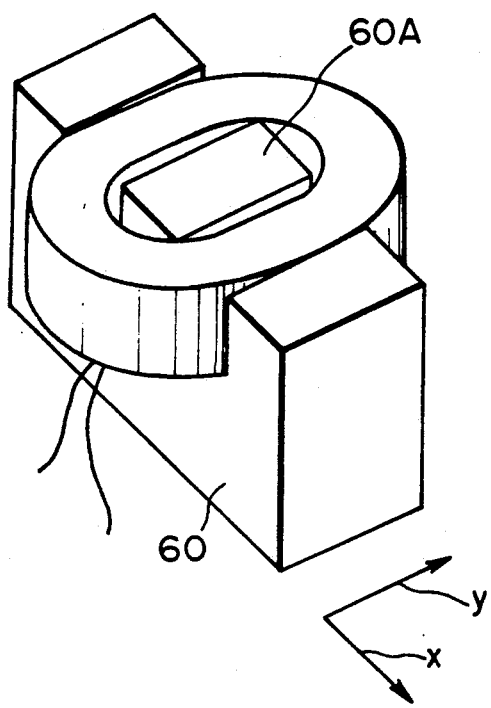
FIG. 8 is a perspective view of another exemplary embodiment of the invention.

The embodiment mentioned is concerned with an exemplary case where the magnetic circuit of the magnetic head 20 is formed by the E-shaped core 50 including the horizontally sectioned square center core element 50A. However, it is to be understood that the present invention is not limited to the above embodiment alone. The magnetic head may be so modified as illustrated in FIG. 8, wherein a magnetic circuit is formed by the use of an E-shaped core 60 with a horizontally sectioned rectangular center core element 60A in which the length in the y-direction is longer than the length in the x-direction.

In this modified structure, the applicable range of the modulated magnetic field can be expanded in the y-direction by an amount corresponding to the increased y-direction length of the center core element 60A.

The horizontal sectional shape of the center core element is not limited to a square or a rectangle alone, and the requisite thereof resides in that the horizontal sectional length of the center core element in one direction is equal to or longer than the length in another orthogonal direction extending from the center core element toward the two side core elements. For example, there may be used an E-shaped core where the horizontal sectional shape of its center core element is circular, elliptical or the like.

In the above embodiment, the cylindrical coil 51 is wound around the center core element 50A. However, the shape of the coil 51 is not limited to this example alone because the coil 51 may be any suitable tubular shape having a square or rectangular horizontal section.

Although the cylindrical coil 51 is wound directly around the center core element 50A in the above embodiment, the present invention is not limited thereto, and a coil wound around a bobbin may be disposed in the center core element as well.

Furthermore, in the magneto-optical disk recording apparatus 10 of the above embodiment, a magneto-optical disk 2 is loaded or ejected by manually opening or closing the cover 11. However, the present invention is not limited merely to this example, and it may be applied also to a disk apparatus of some other type where a magneto-optical disk is loaded or ejected by moving a tray or the like.

According to the present invention, as described hereinabove, a magnetic circuit of a magnetic head is formed by the use of an improved E-shaped core where the horizontal sectional length of its center core element in one direction extending toward side core elements is set to be equal to or longer than the horizontal sectional length in another direction orthogonal thereto, whereby the applicable range of a modulated magnetic field can be expanded as compared with that in any conventional apparatus.

Consequently, it becomes possible to realize a compact magneto-optical disk recording apparatus with a simplified structure.

What is claimed is:

1. A magneto-optical disk recording apparatus comprising:
    an optical head shiftable in the diametrical direction of a magneto-optical disk for irradiating a light beam onto the magneto-optical disk;
    a magnetic head disposed to be opposite said optical head with the magneto-optical disk interposed therebetween for applying a magnetic field to the magneto-optical disk, said magnetic head being shifted in the diametrical direction of the magneto-optical disk; and
    means for shifting said optical head and said magnetic head in said diametrical direction of said disk;
    wherein said magnetic head consists of an E-shaped core and a coil wound around a center core element thereof, said E-shaped core being so formed that the intensity of the magnetic field generated from said magnetic head changes more gradually in the diametrical direction of the magneto-optical disk than in a direction orthogonal thereto.

2. A magneto-optical disk recording apparatus according to claim 1, wherein said magnetic head is so formed that a sectional length of said center core element in one direction extending toward two side core elements equals a sectional length in another direction orthgonal thereto, and said magnetic head is so disposed that said orthogonal direction coincides with the diametrical direction of the magneto-optical disk.

3. A magneto-optical disk recording apparatus according to claim 1, wherein said magnetic head is so formed that a sectional length of said center core element in one direction extending toward two side core elements is shorter than a sectional length in another direction orthogonal thereto, and said magnetic head is so disposed that said orthogonal direction coincides with the diametrical direction of the magneto-optical disk.

4. A magneto-optical disk recording apparatus comprising:
    a body equipped with an optical head shiftable in the diametrical direction of a magneto-optical disk for irradiating a light beam onto the magneto-optical disk;
    a cover hingedly attached to said body;
    a magnetic head disposed in said cover to be shiftable in the diametrical direction of the magneto-optical disk for applying a magnetic field to the disk;
    wherein said magnetic head consists of an E-shaped core and a coil wound around a center core element thereof, said E-shaped core being so formed that the intensity of the magnetic field generated from said magnetic head changes more gradually in the diametrical direction of the magneto-optical disk than in a direction orthogonal thereto;
    means for shifting said optical head and said magnetic head in said diametrical direction of the disk; and
    lock means for swinging said magnetic head relative to the magneto-optical disk in compliance with movement of the cover.

5. A magneto-optical disk recording apparatus according to claim 4, further comprising: said shifting means comprising optical head support means for supporting said optical head to be shiftable in the diametrical direction of the magneto-optical disk; magnetic head support means for supporting said magnetic head to be shiftable in the diametrical direction of the magneto-optical disk; and means for connecting said optical means to each other.

6. A magneto-optical disk recording apparatus according to claim 5, wherein said magnetic head support means is so held in said cover as to be shiftable in the diametrical direction of the magneto-optical disk and to be swingable together with said cover.

7. A magneto-optical disk recording apparatus according to claim 6, further comprising control means for controlling the amount of swing of said magnetic head support means.

8. A magneto-optical disk recording apparatus according to claim 7, wherein said control means has a mechanism for adjusting the amount of swing of said magnetic head support means.

* * * * *

UNITED STATES PATENT AND TRADEMARK OFFICE
CERTIFICATE OF CORRECTION

PATENT NO. : 5,072,431
DATED : December 10, 1991
INVENTOR(S) : Takashi Ohmori; Hirotoshi Fujisawa It is certified that error appears in the above-identified patent and that said Letters Patent is hereby corrected as shown below:

```
Col. 1, line 24, after "information" delete ","
Col. 4, line 56, change "30" to --10--
        line 61, after "head" insert --20--
Col. 5, line 16, after "thereby" insert --,--
        line 45, change "make" to --makes--
        line 61, change "sectional" to --sectioned--

Col. 8, line 37, after "optical" insert --head support
means and said magnetic head support--
```

Signed and Sealed this

Fifteenth Day of June, 1993

Attest:

MICHAEL K. KIRK

Attesting Officer

Acting Commissioner of Patents and Trademarks